(12) United States Patent
Somasundaram et al.

(10) Patent No.: US 10,410,430 B2
(45) Date of Patent: Sep. 10, 2019

(54) SYNCHRONIZATION AND ANIMATION OF VIEWS SHOWING DIGITAL 3D MODELS OF TEETH

(71) Applicant: 3M INNOVATIVE PROPERTIES COMPANY, St. Paul, MN (US)

(72) Inventors: Guruprasad Somasundaram, Minneapolis, MN (US); Evan J. Ribnick, St. Louis Park, MN (US); Matthew R. Cruikshank, St. Paul, MN (US); Lindsay Labahn, St. Paul, MN (US); Judy J. Ma, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 15/042,424

(22) Filed: Feb. 12, 2016

(65) Prior Publication Data

US 2017/0236327 A1 Aug. 17, 2017

(51) Int. Cl.
*G06T 19/20* (2011.01)
*G06T 7/33* (2017.01)

(52) U.S. Cl.
CPC .............. *G06T 19/20* (2013.01); *G06T 7/33* (2017.01); *G06T 2200/04* (2013.01); *G06T 2207/10028* (2013.01); *G06T 2210/41* (2013.01); *G06T 2219/2021* (2013.01)

(58) Field of Classification Search
None
See application file for complete search history.

(56) References Cited

U.S. PATENT DOCUMENTS

| | | |
|---|---|---|
| 7,133,052 B1 | 11/2006 | Silva |
| 7,605,817 B2 | 10/2009 | Zhang et al. |
| 7,956,862 B2 | 6/2011 | Zhang et al. |
| 2001/0002310 A1 | 5/2001 | Chishti et al. |
| 2002/0064759 A1 | 5/2002 | Durbin et al. |
| 2004/0061791 A1* | 4/2004 | Terada ............... H04N 5/2621 348/231.2 |

(Continued)

FOREIGN PATENT DOCUMENTS

WO  WO 2006/115841  11/2006

OTHER PUBLICATIONS

Bendels et al, "Image-Based Registration of 3D-Range Data Using Feature Surface Elements", The 5th International Symposium on Virtual Reality, Archaeology and Cultural Heritage VAST, pp. 115-124, 2004.*

(Continued)

*Primary Examiner* — Kee M Tung
*Assistant Examiner* — Patrick F Valdez

(57) ABSTRACT

Systems and methods for displaying synchronized views and animations of digital 3D models of a person's intra-oral structure such as teeth. Two digital 3D models obtained from scans at different times are displayed in side-by-side views and synchronized via registration of the two scans or corresponding models. A user's control input to one displayed model causes the same manipulation of both models since they are registered. The two digital 3D models can also be displayed in an animation mode where the first model slowly morphs into the second model to illustrate changes in the intra-oral structure over time.

13 Claims, 14 Drawing Sheets

(56) References Cited

U.S. PATENT DOCUMENTS

| | | | |
|---|---|---|---|
| 2005/0095562 A1 | 5/2005 | Sporbert et al. | |
| 2006/0028487 A1* | 2/2006 | Hsiung | H04N 5/265 345/619 |
| 2006/0052686 A1* | 3/2006 | Zhang | G06T 7/32 600/407 |
| 2009/0325127 A1* | 12/2009 | Kusch | A61C 1/084 433/201.1 |
| 2011/0050848 A1* | 3/2011 | Rohaly | G06T 15/10 348/43 |
| 2011/0131014 A1* | 6/2011 | Bates | G06T 17/10 703/1 |
| 2011/0268326 A1* | 11/2011 | Kuo | G06T 7/33 382/128 |
| 2012/0015316 A1 | 1/2012 | Sachdeva et al. | |
| 2013/0060146 A1* | 3/2013 | Yang | A61B 5/055 600/476 |
| 2013/0177224 A1* | 7/2013 | Papageorgiou | G06K 9/6206 382/131 |
| 2014/0249779 A1* | 9/2014 | Cheung | G06F 17/50 703/1 |
| 2014/0253546 A1* | 9/2014 | Hickman | G09G 5/00 345/419 |
| 2014/0257763 A1* | 9/2014 | Fang | G06F 17/50 703/1 |
| 2015/0049081 A1* | 2/2015 | Coffey | G06T 19/006 345/419 |
| 2015/0131880 A1* | 5/2015 | Wang | G06T 3/0075 382/131 |
| 2015/0320320 A1* | 11/2015 | Kopelman | A61B 5/0088 433/24 |
| 2016/0004811 A1 | 1/2016 | Somasundaram et al. | |
| 2016/0180600 A1* | 6/2016 | Liu | G06T 19/20 345/419 |
| 2016/0220200 A1* | 8/2016 | Sandholm | A61B 8/08 |
| 2016/0259515 A1* | 9/2016 | Sabina | A61C 9/0053 |
| 2017/0071706 A1* | 3/2017 | Lee | A61C 13/0004 |

OTHER PUBLICATIONS

Cho H.J., "Three-Dimensional Superimposition", PCSO Bulletin, [online], [retrieved Sep. 20, 2018], URL: www.pcsortho.org/LinkClick.aspx?fileticket=aq9D-7fZKpU%3D&tabid=125. (Year: 2010).*
InVivo5.2 Reference Manual (Year: 2012).*
Grauer D. "Three-Dimensional Applications in Orthodontics", Ph.D. Dissertation, UNC-Chapel Hill, 2010. (Year: 2010).*
3M™ True Definition Scanner Technical Specifications, 2015, 1 page.
Besl, "A Method for Registration of 3-D Shapes," IEEE Transactions on Pattern Analysis and Machine Intelligence, Feb. 1992, vol. 14, No. 2, pp. 239-256.
Chen, "Object Modeling by Registration of Multiple Range Images," Proceedings of the 1991 IEEE International Conference on Robotics and Automation Sacramento, California, Apr. 1991, pp. 2724-2729.
ITero Element, 2015, 11 pages.
Mulder, "Pixel Masks for Screen-Door Transparency," Proceedings of the IEEE Visualization 1998 (VIZ'98), 1998, 8 pages.
Trios Digital Impression Solution, 2015, 7 pages.
Wolberg, "Image Morphing a Survey," The Visual Computer, 1998, vol. 14, pp. 360-372.

* cited by examiner

SYNCHRONIZATION AND ANIMATION OF VIEWS SHOWING DIGITAL 3D MODELS OF TEETH

BACKGROUND

Digital dentistry is a growing trend with an increasing number of dentists relying on digital impressioning systems. These systems use an intra-oral scanning wand, or scanning of a traditional physical impression, and an associated processing system to generate a digital three-dimensional (3D) model of patients' teeth. In some cases, it may be desirable to compare two digital 3D models of the same patient, acquired with such a system, for diagnostic or other analytical purposes. One of the processing steps in these types of analyses is typically to align or register the two 3D models as closely as possible to one another based on their geometric shapes. The classical approach for registering 3D data is a well-known algorithm called Iterative-Closest Point (ICP) matching, of which there are several variants. However, ICP requires a good initialization to work effectively, meaning the 3D models must already be nearly aligned, and then in most cases ICP merely refines this alignment. In cases where the 3D models are not initially well aligned, or are far apart from one another in position or orientation, ICP often does not adequately work to align or register the two models.

Accordingly, a need exists for registering digital 3D models of teeth for use in displaying the registered models for diagnostic or other purposes.

SUMMARY

A method for displaying synchronized views of digital 3D models, consistent with the present invention, includes receiving first and second digital 3D models of a person's intra-oral structure. The second digital 3D model is obtained at a different time from the first digital 3D model, and the first digital 3D model is registered with the second digital 3D model. The method also includes displaying the first and second digital 3D models on an electronic display device at the same time and synchronizing the display of the first and second digital 3D models via the registration of them.

A method for displaying an animation of digital 3D models, consistent with the present invention, includes receiving first and second digital 3D models of a person's intra-oral structure. The second digital 3D model is obtained at a different time from the first digital 3D model, the first digital 3D model is registered with the second digital 3D model, and the first and second digital 3D models are each rendered to pixels. The method also includes displaying the first digital 3D model, displaying the second digital 3D model, and progressively displaying, between the display of the first and second digital 3D models, fewer pixels of the first digital 3D model and more pixels of the second digital 3D model.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

The use of digital 3D models in the dental market is becoming more prevalent. These models can be acquired in vivo using an intra-oral scanner or off-line by laser scanning of a traditional impression. The digital 3D models can be used for varied clinical tasks including treatment planning, crown and implant preparation, and in diagnostic aides, for example to assess or visually illustrate tooth wear. Examples of techniques for detecting tooth wear from intra-oral 3D scans are disclosed in U.S. Patent Application Publication No. 2016/0004811, which is incorporated herein by reference as if fully set forth.

Embodiments of the present invention use registered digital 3D models for displaying digital scans from a same patient or other person taken at different times to visually illustrate changes in them, which can be used for diagnostic, treatment, or other purposes. The registration of the digital 3D models or scans uses a technique, referred to as a transform, for robustly aligning two digital 3D models of dentition even when they are initially severely misaligned. This transform uses ICP as one of the steps in its iteration, while adding other higher-level mechanisms for achieving reliable convergence.

Figure 1:
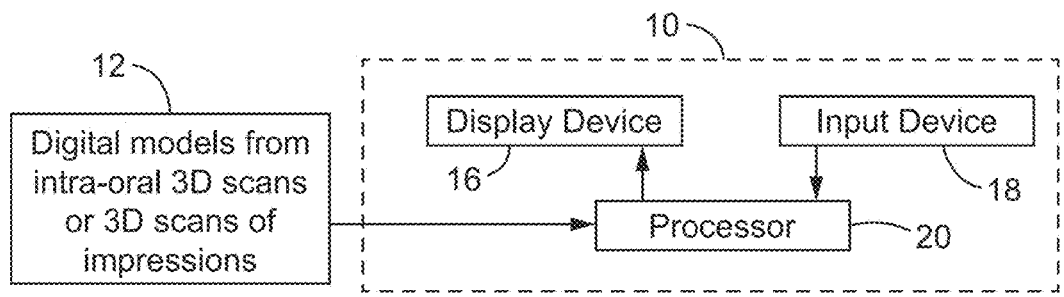
FIG. 1 is a diagram of a system for displaying digital 3D models of intra-oral structures for diagnostic or other purposes.
Figure 2:
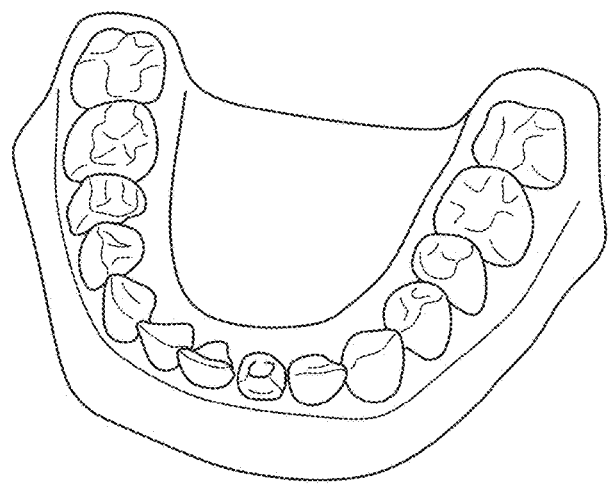
FIG. 2 illustrates a 3D model of teeth from intra-oral scans.

FIG. 1 is a diagram of a system 10 for displaying synchronized and animated views of digital 3D models from intra-oral scans. System 10 includes a processor 20 receiving digital 3D models of teeth or other intra-oral structures (12) from intra-oral 3D scans or scans of impressions of teeth. System 10 can also include an electronic display device 16 for displaying digital 3D models from scans of intra-oral structures and an input device 18 for receiving user commands or other information. An example of a digital 3D model of a patient's teeth from a scan is shown in FIG. 2. Systems to generate digital 3D images or models based upon image sets from multiple views are disclosed in U.S. Pat. Nos. 7,956,862 and 7,605,817, both of which are incorporated herein by reference as if fully set forth. These systems can use an intra-oral scanner to obtain digital images from multiple views of teeth or other intra-oral structures, and those digital images are processed to generate a digital 3D model or scan representing the scanned teeth or other intra-oral structure. The 3D models or scans can be implemented as, for example, a polygonal mesh or point cloud representing the surface of the scanned object or intra-oral structure.

Intra-oral structures include dentition, and more typically human dentition, such as individual teeth, quadrants, full arches, pairs of arches which may be separate or in occlusion of various types, soft tissue (e.g., gingival and mucosal surfaces of the mouth, or perioral structures such as the lips, nose, cheeks, and chin), and the like, as well bones and any other supporting or surrounding structures. Intra-oral structures can possibly include both natural structures within a mouth and artificial structures such as dental objects (e.g., prosthesis, implant, appliance, restoration, restorative component, or abutment).

System 10 can be implemented with, for example, a desktop, notebook, or tablet computer. System 10 can receive the 3D scans locally or remotely via a network. Display device 16 can be implemented with any electronic display, for example a liquid crystal display (LCD), light emitting diode (LED) display, or organic light emitting diode (OLED) display. Input device 18 can be implemented with any device for entering information or commands, for example a keyboard, microphone, cursor-control device, or touch screen.

Registration of Scans

Figure 3A:
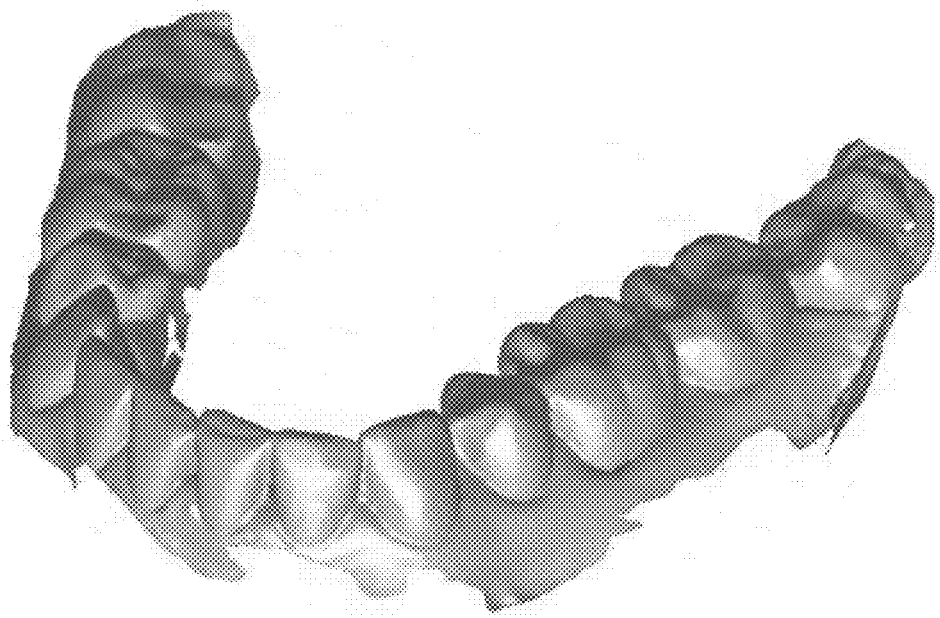
FIGS. 3A and 3B are examples of digital 3D models from two intra-oral scans from the same patient.
Figure 3B:
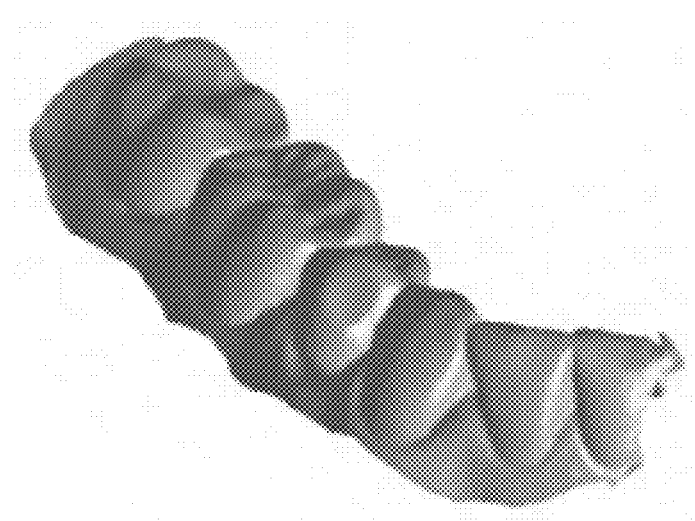

Before two digital 3D models or scans can be compared, for example to analyze their differences, they are first registered with one another. Registration involves fitting one digital 3D model or scan as closely as possible, or within a certain degree of accuracy, within another digital 3D model or scan. Digital 3D models, even of the same patient or other person, are often severely misaligned with one another due to the conditions under which they were captured. Furthermore, one of the scans may contain data from a full arch, while the other may be a quadrant scan containing data from only 4-6 teeth. Both of these factors may cause conventional ICP registration approaches to not work for registration of the scans. Examples of digital 3D models from two scans of the same patient, illustrating both of these complicating factors, are shown in FIGS. 3A and 3B, where FIG. 3A shows a model from a scan of a full arch and FIG. 3B shows a model from a scan of a quadrant from the same patient.

The transform approach described herein to register digital 3D models or scans proceeds with the following Steps 1-4 and executed in the following order.

Step 1. Two digital 3D models are received, which may be either full-arch or quadrant scans and which may be in severe misalignment.

Figure 4A:
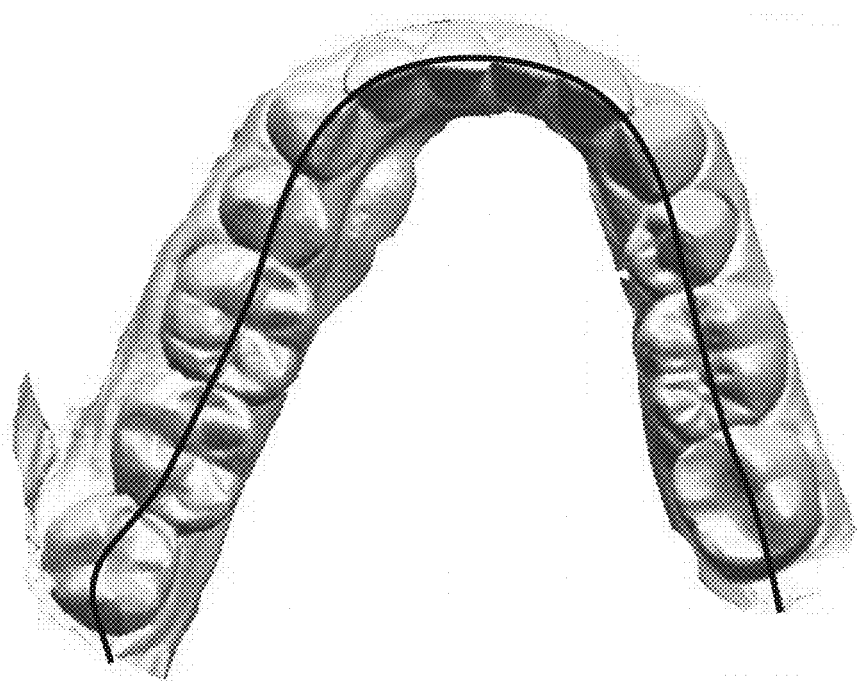
FIGS. 4A and 4B illustrate the digital 3D models of FIGS. 3A and 3B with arch curve approximations.
Figure 4B:
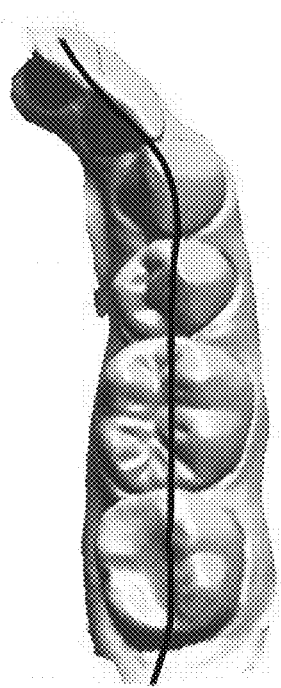
Figure 5A:
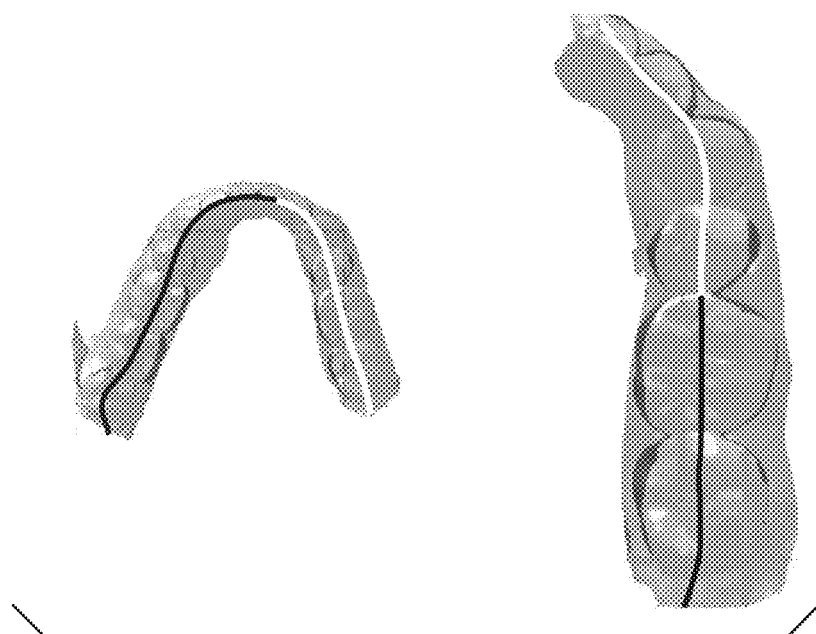
FIGS. 5A-5F illustrate examples of initial starting points for the digital 3D models of FIGS. 3A and 3B for registration of them.
Figure 5B:
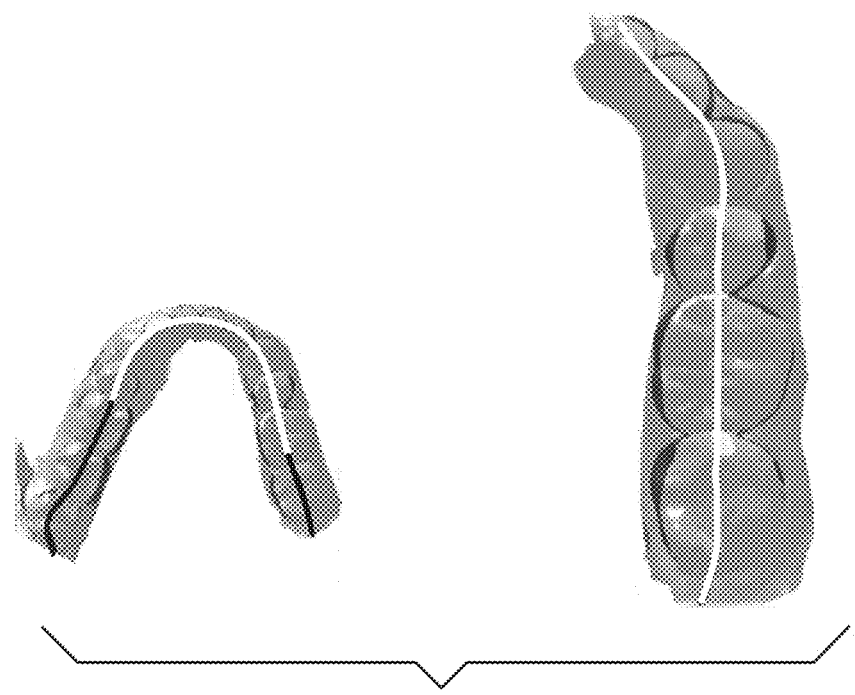
Figure 5C:
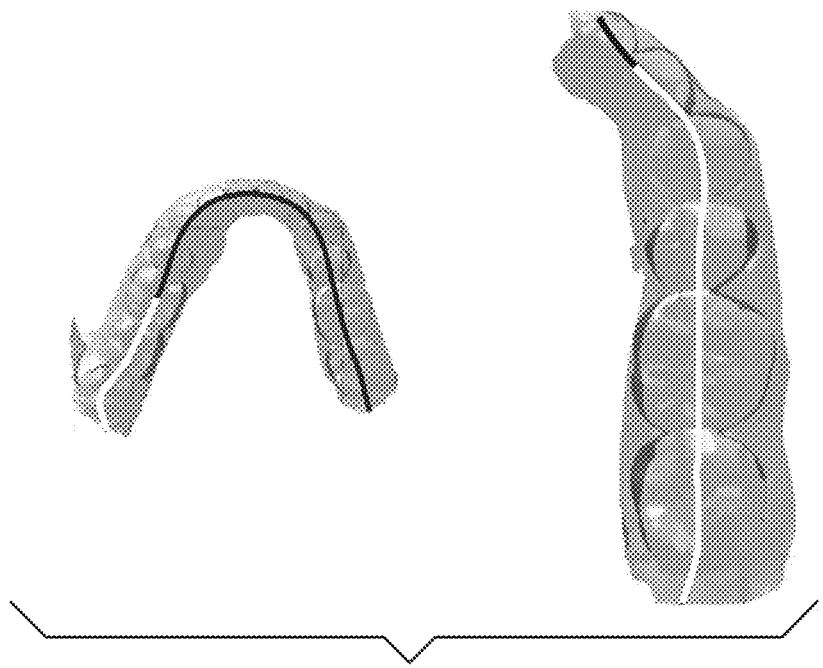
Figure 5D:
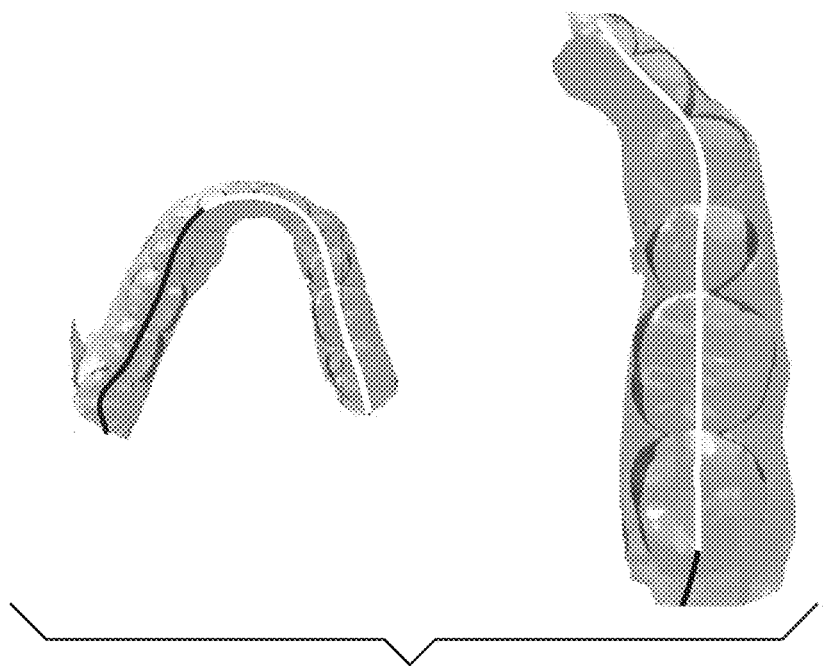
Figure 5E:
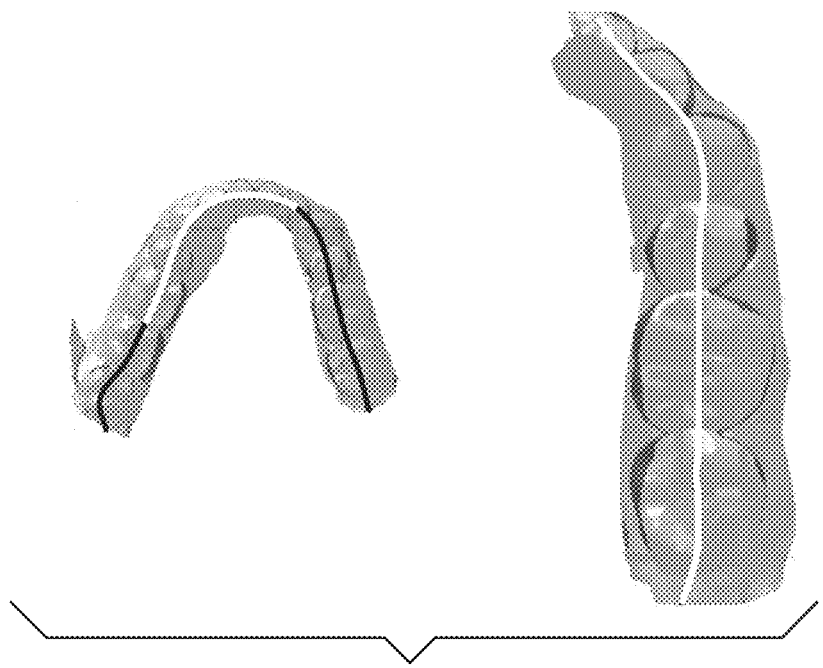
Figure 5F:
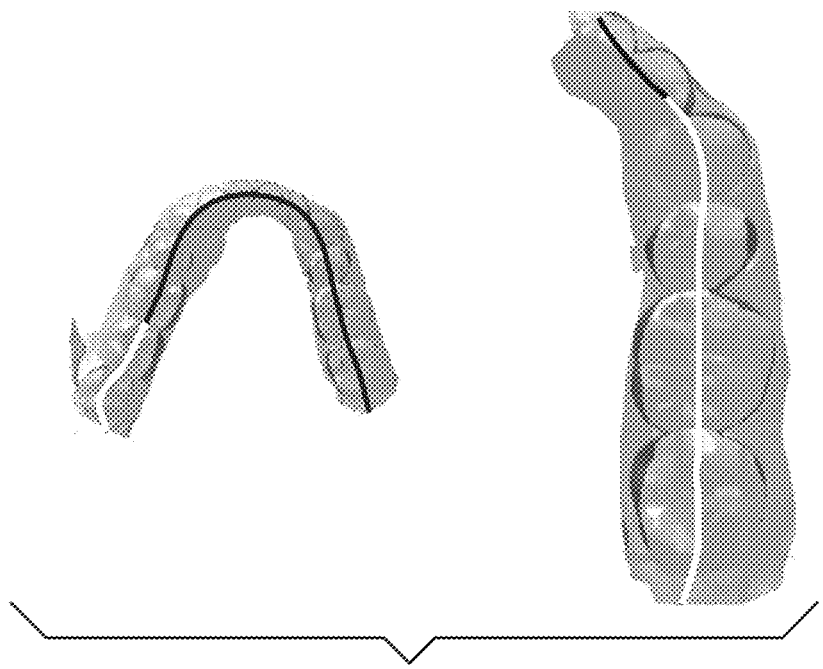

Step 2. For each digital 3D model, the transform computes a smooth curve which approximates the shape of the arch in the model. There are several ways to compute this this curve. A particularly useful way is to use a non-linear manifold embedding technique to compute a one-dimensional approximation of the 3D data contained in the scan. One such manifold embedding algorithm is Locally Linear Embedding (LLE). Further post-processing steps may be performed to ensure to compute a curve passing through this approximation, and to sample this curve uniformly and at the desired density. Examples of these arch curve approximations are shown in FIGS. 4A and 4B where curves (the dark lines) are shown on the digital 3D models of FIGS. 3A and 3B.

Step 3. Treating the smooth curve as a guide, one arch is incrementally slid to different positions along the curve of the other. ICP is run at each of these starting points. In particular, at each position:

Step 3.a. The two digital models of the arches are registered together using ICP, using this position as the starting point for registration. For speed, low resolution (highly subsampled) versions of the meshes for the two scans are used, and only the parts of the mesh that approximately overlap at this particular shift position are used in the registration.

Step 3.b. After these two models are aligned as well as possible by ICP, the resulting rotation and translation are stored. In addition, the distance from each point in the first 3D model to the nearest point in the second 3D model is computed each time and used later to decide which starting point causes ICP to converge at the best solution. For example, the transform takes the $75^{th}$ percentile of these distances and stores it. The transform denotes this value as the "distance score" resulting from this particular initial shift along the arch curves in the models.

An example of different initial starting points as one arch is slid along the other is shown in FIGS. 5A-5F for the digital 3D models of FIGS. 3A and 3B. In each frame of the arch curves shown in FIGS. 5A-5F, the portion of the curves shown as a white (lighter) line is the part overlapping with the other arch, while the remainder of the curves shown as a black (darker) line is not overlapping.

Figure 6:
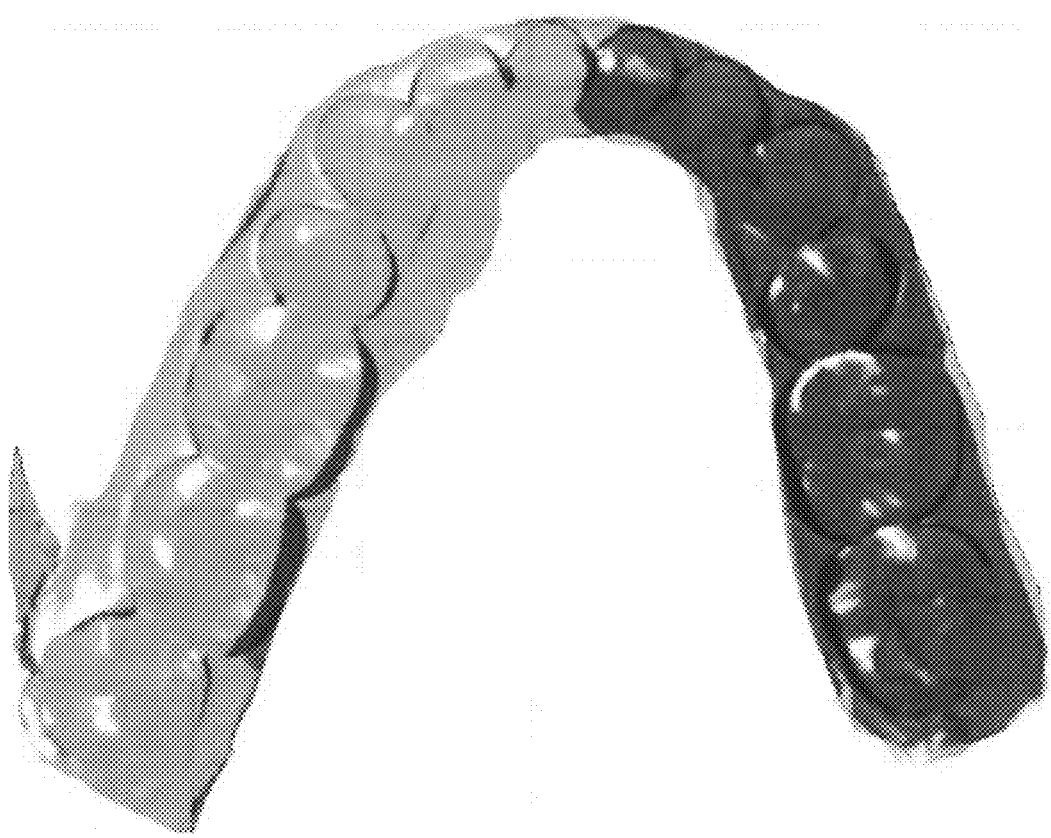
FIG. 6 illustrates the digital 3D models of FIGS. 3A and 3B after registration with the overlapping portions of the models registered at full resolution.

Step 4. The shift along the arch curves that resulted in the smallest distance score is selected as the best initial starting point. The digital 3D models are then re-registered using ICP from this best starting point, this time using the full resolution of the scans. As before, only the overlapping parts of the two models or scans are used in this registration to avoid problems with outlying points pulling the scan away from the ideal solution. Then, the resulting transformation (rotation and translation) is applied to the full scan. An example of one such final result is shown in FIG. 6 illustrating registration of the digital 3D models shown in FIGS. 3A and 3B with the quadrant scan (darker portion) registered with the full-arch scan (lighter portion).

As an alternative to the transform described above, models or scans can be registered with one another using one or more of the following techniques: ICP with Euclidean distance metric; ICP with Normal or point to plane distance metric; ICP with non-linear objective function; ICP with Ransac method for choosing inliers; non-rigid ICP with scaling and affine transformation correction; or any of the preceding with dual correspondences. Other algorithms for registering models or scans that can optionally be used are described in U.S. Patent Application Publication No. 2016/0004811.

As another alternative to the transform described above, models or scans can be registered with one another using a manual technique. For example, a user can select (e.g., "click on" using a cursor-control device) 4 points on each of the two models or scans, effectively identifying 4 points on the corresponding meshes for the models or scans, and the models or scans are registered with one another at those user-selected points.

Synchronization of Views

Figure 7:
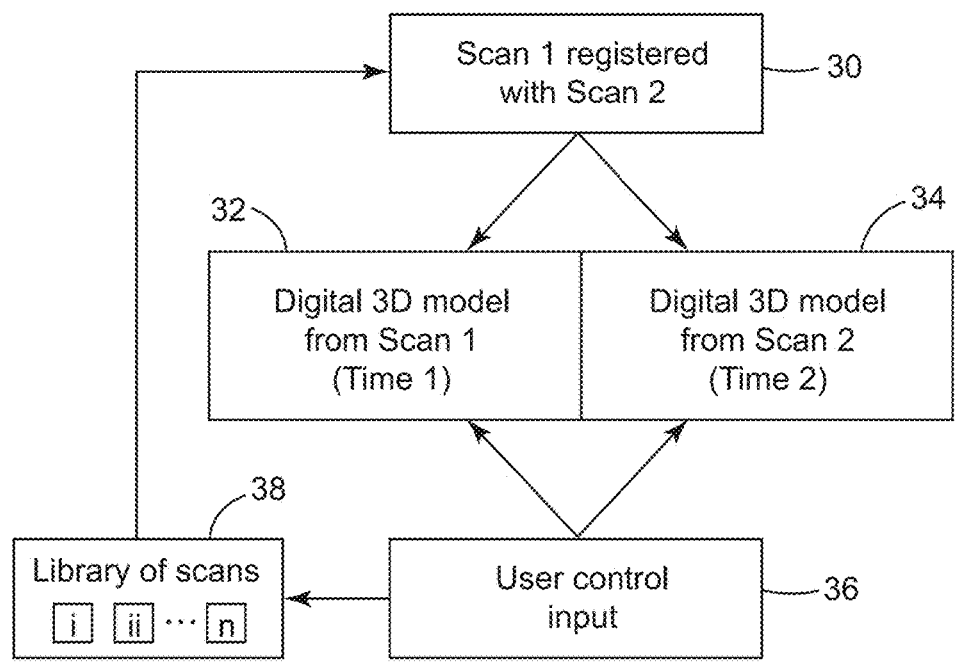
FIG. 7 is a diagram illustrating side-by-side views of registered digital 3D models or scans.

Given digital 3D models from scans of a patient's or other person's intra-oral structure (e.g., teeth) at two different times, the models or scans are registered using the transform described above to synchronize two side-by-side views of the models that a user can manipulate to investigate different parts of the anatomy. FIG. 7 is a diagram illustrating side-by-side views of registered digital 3D models or scans. Scan 1 is registered with scan 2, for example using the transform above, and stored as registered scans 30, as represented by the registered digital 3D models corresponding with scans 1 and 2. The scans 1 and 2 are from the same patient or other person taken at different times, shown as times 1 and 2. The registered digital 3D models from scans 1 and 2 are displayed side-by-side in views 32 and 34 in a user interface on an electronic display device such as display device 16. For example, the meshes for each of the registered digital 3D models are separated for the display in views 32 and 34, even though the meshes for the digital 3D models are still registered with one another.

Views 32 and 34 can be shown, for example, in windows or other portions of the user interface. Since the scans have been registered to each other, the visualization divides the screen (or a portion of it) of the display device in half—on the left half of the screen, it shows only the digital 3D model from the first scan from time 1 (view 32), and then the visualization uses the same camera configuration to draw only the second (newer) digital 3D model from the other scan on the right half of the screen from time 2 (view 34). User control input 36 can be used to manipulate the digital 3D model in one of the views 32 or 34 with the digital 3D model in the other view being subject to the same manipulation due to the synchronization resulting from registration of the models or scans.

The digital 3D models for the scans to be displayed in views 32 and 34 can be obtained from a library (38) of scans i-n. Library 38 can store scans from the same person or different persons, and the scans from the same person taken at different points in time can be registered in library 38 or registered for display in views 32 and 34. A user can select, via user control input 36, scans in library 38 to be displayed as the registered digital 3D models in views 32 and 34. Library 38 can also display the scans i-n in an album, and the user can select (e.g., "swipe") scans to rotate or advance through views of them in the album using a touch screen or cursor-control device. If the user does not select scans to be viewed, the system can select default scans for use in displaying the registered and synchronized views of them. For example, the default scans can be selected from the last two scans from the same person, or two scans from the same person taken at a particular time interval.

User control input 36 can be received from input device 18, for example, and can include the following commands: rotate; zoom in or out; translate; and pan. User control input 36 can also include commands for color rendering of the displayed digital 3D models or scans. For example, the color for the displayed digital 3D model can be preselected and rendered based on (x) measurement=(y) color value as stored in, for example, a color mapping table or other data structure. User control input 36, such as a user's selection on a displayed slide bar, can allow the user to manipulate the color value mapping to the measurement in the event the user wants to amplify the severity of a feature in the displayed intra-oral structure or for other purposes. The preselected color for the color rendering can also be used to indicate changes in the displayed intra-oral structure; for example, the color red (or shades of red) can indicate negative changes, and the color blue (or shades of blue) can indicate positive changes. The commands for user control input 36 can optionally be displayed as icons on a display device, possibly overlaid on views 32 and 34, and selected via a touch screen, cursor-control device, or other input device.

Figure 8:
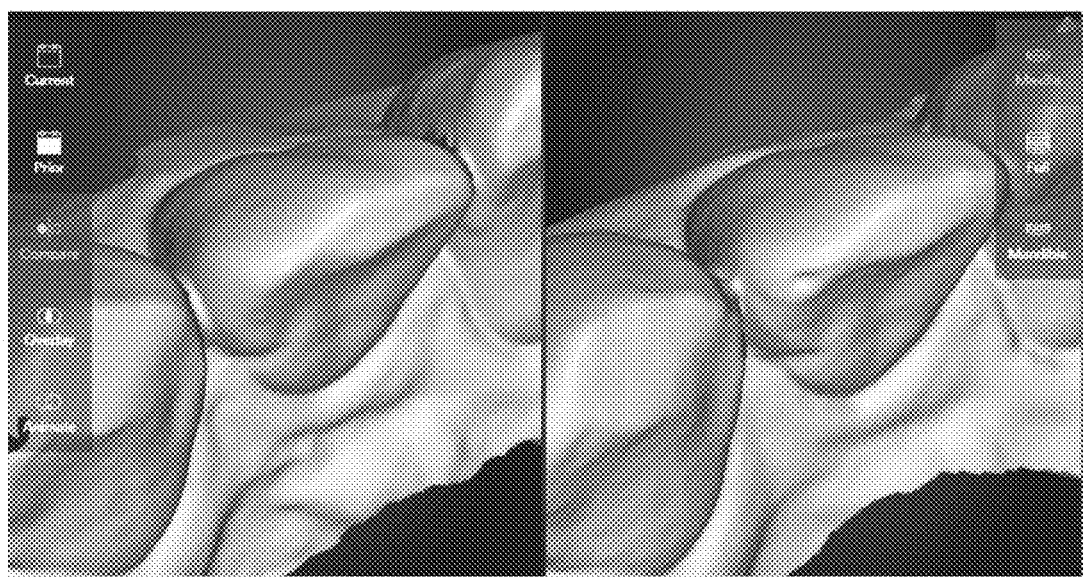
FIG. 8 is a user interface showing an example of two registered digital 3D models or scans in a side-by-side view.

FIG. 8 is a user interface showing an example of two registered digital 3D models from scans in the side-by-side view. In this example, the scan on the right shows a divot missing from a tooth with the scan on the left showing the same tooth from a prior scan and without the divot. In this way, the doctor and patient can visualize changes that have occurred in the teeth over time. As the user rotates, pans, and zooms one of the views, for example as shown in FIG. 8, the other view is kept in synchronization so that if the user interactively zooms in to display for instance the buccal side of tooth number 2 at time 1 in one view, the buccal side of the same tooth number 2 at time 2 is automatically displayed in the other view.

The synchronized views can be displayed side-by-side on the same display device. Alternatively, the synchronized views can be displayed on different display devices located adjacent one another where a user can view both or, for example, the user can view one display device and a patient can view the other. As another alternative, the synchronized views can be displayed on different display devices located remote from one another. When the views are displayed on different display devices, those multiple display devices can collectively be considered "an electronic display device" for display of the views. Although two views are shown, the synchronization can optionally show views of more than two registered digital 3D models from more than two scans and, since the models are all registered with one another, control of one view causes the synchronous control of the other views.

Animation Mode

Given digital 3D models from scans of a patient's or other person's intra-oral structure (e.g., teeth) at two different times, the models or scans are registered using the transform described above to synchronize two blended views in an animation mode that the user can manipulate to investigate different parts of the anatomy. The models or scans are also rendered to pixels for display in the animation mode.

Figures 9, 10:
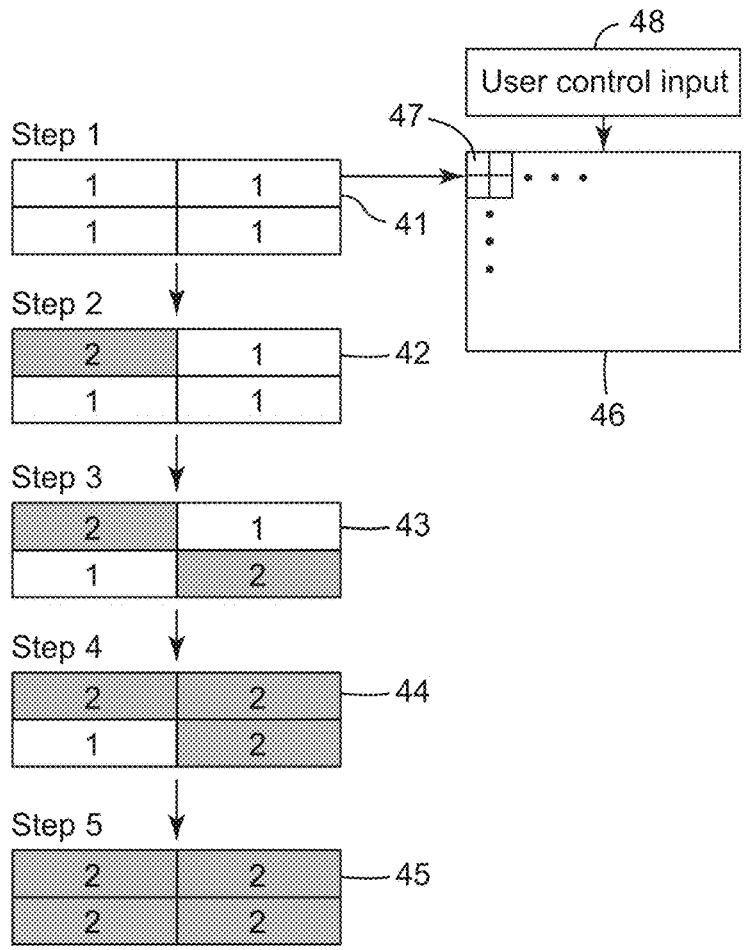
FIG. 9 is a process flow for steps of an animation mode to show changes between two digital 3D models from intra-oral scans using a 2×2 grid.
FIG. 10 is a diagram illustrating three digital 3D models or scans for display in the animation mode.

An embodiment of this animation mode uses 5 time steps, and then starts back over at step 1. In this way, the doctor and patient can visualize changes that have occurred in the teeth over that time. As illustrated in FIG. 9, the visualization divides the screen of a display device 46 into a pixel checkerboard composed of grids such as a 2×2 grid 47. The 2×2 grid shown in FIG. 9 is repeated to form the checkerboard through which the views are displayed on display device 46, which may correspond with display device 16.

As shown in FIG. 9, at step 1, a version 41 of the grid displays four pixels from the digital 3D model or scan 1 (identified as "1" in the grid). At step 2, for instance, only one pixel from the second digital 3D model or scan (identified as "2" in the grid) and three pixels from the first scan are displayed out of every four pixels in a version 42 of the grid. At step 3, for instance, two pixels from the second scan and two pixels from the first scan are displayed in a version 43 of the grid. At step 4, for instance, only one pixel from the first scan and three pixels from the second scan are displayed in a version 44 of the grid. At step 5, four pixels from the second scan (and no pixels from the first scan) are displayed in a version 45 of the grid. The pattern shown in FIG. 9 is repeated, both horizontally and vertically, across the entire screen (or a portion of it) of display device 46.

The steps 1-5 are executed in sequential order to show the versions 41-45 of the grid, as repeated across the screen of the display device, in that same order at a sufficient time rate to visually illustrate the changes as the first digital 3D model or scan morphs into the second digital 3D model or scan. As illustrated in executing the steps 1-5, the pattern progressively displays, between the display of the first and second digital 3D models or scans, fewer pixels of the first digital 3D model and more pixels of the second digital 3D model. Therefore, at each of the steps 2-4, the animation shows a blended view having pixels from both the first and second digital 3D models.

Preferably, the animation mode displays all pixels of the first digital 3D model and then progressively displays fewer pixels of the first digital 3D model and more pixels of the second digital 3D model until all pixels of the second digital 3D model are displayed. Alternatively, the animation mode can display a sub-set of the pixels in the first and second digital 3D models with the progressive display of fewer and more pixels between display of those sub-sets. As another alternative, portions of the first digital 3D model and portions of the second digital 3D model can be displayed to create blended views between display of the first and second digital 3D models. Also, other frames of the digital 3D models, or other information, can alternatively be inserted in the sequence of the steps in the pattern morphing one digital 3D model to another. The first and second digital 3D models can be obtained from user-selected scans from a library of scans, for example library 38, or from default scans. For example, the default scans can be selected from the last two scans from the same person, or two scans from the same person taken at a particular time interval.

The digital 3D models or scans have been registered to each other, and thus when the pixels are divided as shown in the example of FIG. 9, it appears to the user as though the anatomy blends from one digital 3D model or scan to the next digital 3D model or scan—rather than just abruptly displaying the first scan alternating with the second scan. With a display device that has sufficiently high resolution, the technique appears to the user as though the first digital 3D model or scan is becoming more and more transparent, while the second digital 3D model or scan is become more and more opaque, over 5 time steps. Using this checkerboard technique is advantageous, because it does not require the rendering system to use alpha-blending to combine the colors of an individual pixel. Also, it solves the problem of some geometry from the first scan being closer to the virtual camera than other geometry from the second scan, or vice-versa, which normally can require careful z-sorting in order to use alpha-blending at all. Instead, each pixel is chosen to either show the first model or scan (with no actual alpha-blending, or special z-sorting), or the second model or scan (with no actual alpha-blending, or special z-sorting). Although not required, other blending techniques can optionally be used with the visualization.

The two visualizations share one camera, and the geometry is registered to the same space with the two digital 3D models or scans being registered with one another, for example scan 1 registered with scan 2. A user can manipulate the views with user control input 48 (shown in FIG. 9), which can be received from input device 18, for example, and can include the following commands: rotate; zoom in or out; translate; and pan. User control input 48 can also include color rendering of displayed digital 3D models as described above. The commands for user control input 48 can optionally be displayed as icons on display device 46, possibly overlaid on the animation of the digital 3D models, and selected via a touch screen, cursor-control device, or other input device.

Therefore, as the user rotates, pans, and zooms one of the views from steps 1-5 (displayed versions 41-45 of the repeated grid), the other view is kept in synchronization. If the user interactively zooms in to display for instance the buccal side of tooth #2 on time 1, the buccal side of tooth #2 on time 2 is automatically displayed as well, and the two displayed views appear to visually blend from step 1 to step 5, over and over.

Figure 11:
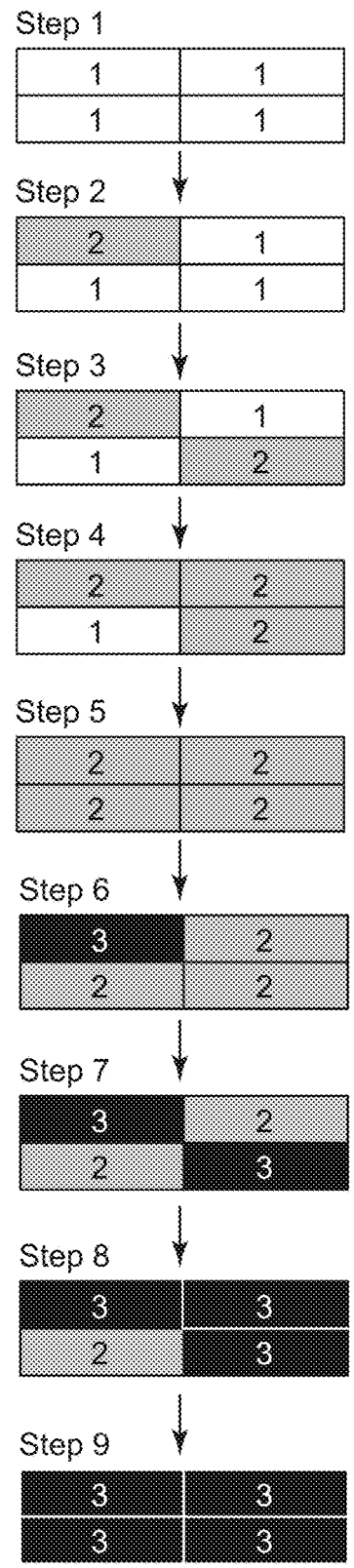
FIG. 11 is a process flow for steps of the animation mode to show changes between the three digital 3D models or scans of FIG. 10.

The animation mode can use more than two digital 3D models or scans. For example, FIG. 10 is a diagram illustrating digital 3D models from three scans (identified as "1," "2," and "3") for display in the animation mode, and FIG. 11 is a process flow for steps 1-9 (executed in the order shown) of the animation mode to show changes between the displayed pixels of the three scans 1, 2, and 3 of FIG. 10.

Figure 12:
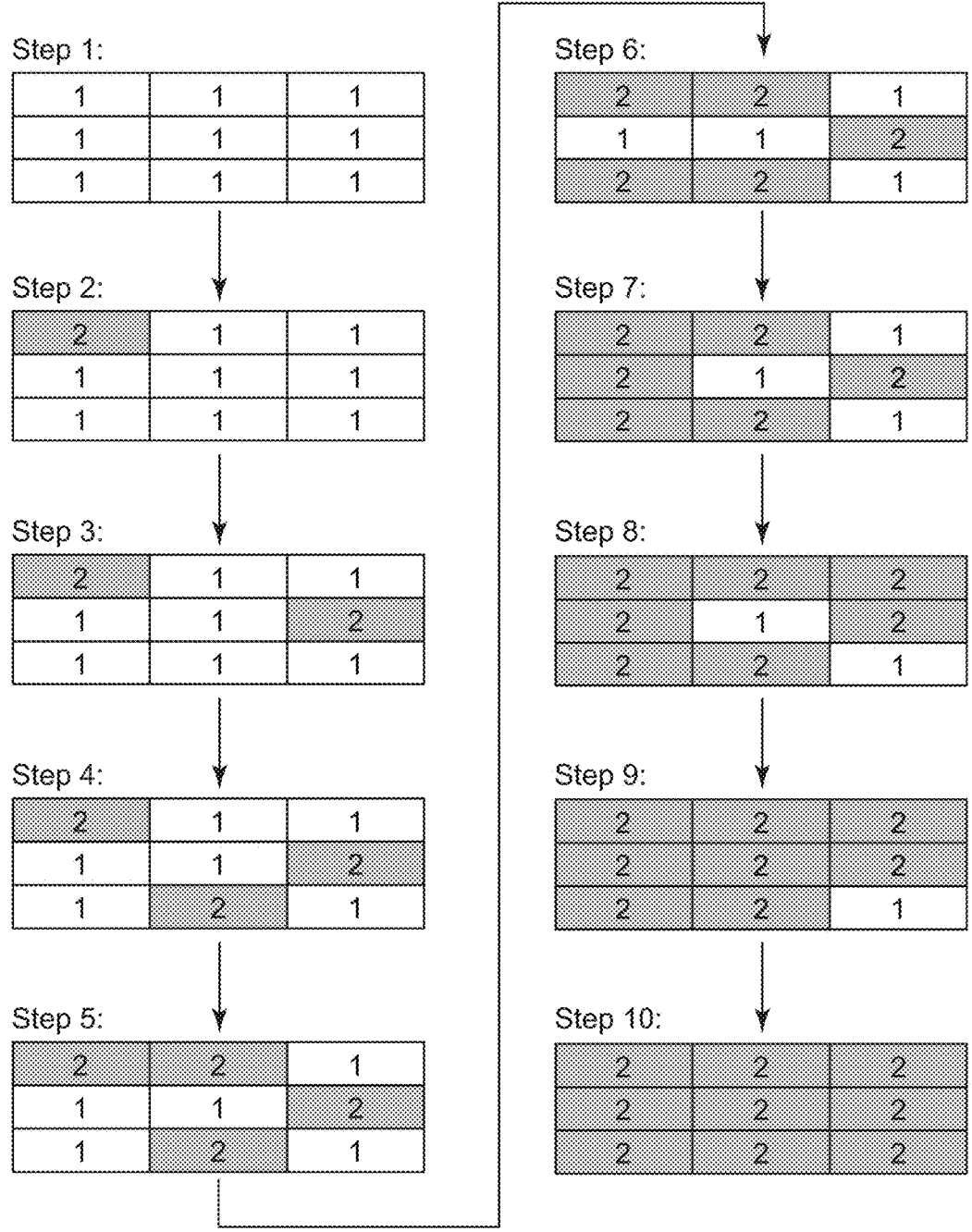
FIG. 12 is a process flow for steps of an animation mode to show changes between two digital 3D models or scans using a 3×3 grid.
Figure 13A:
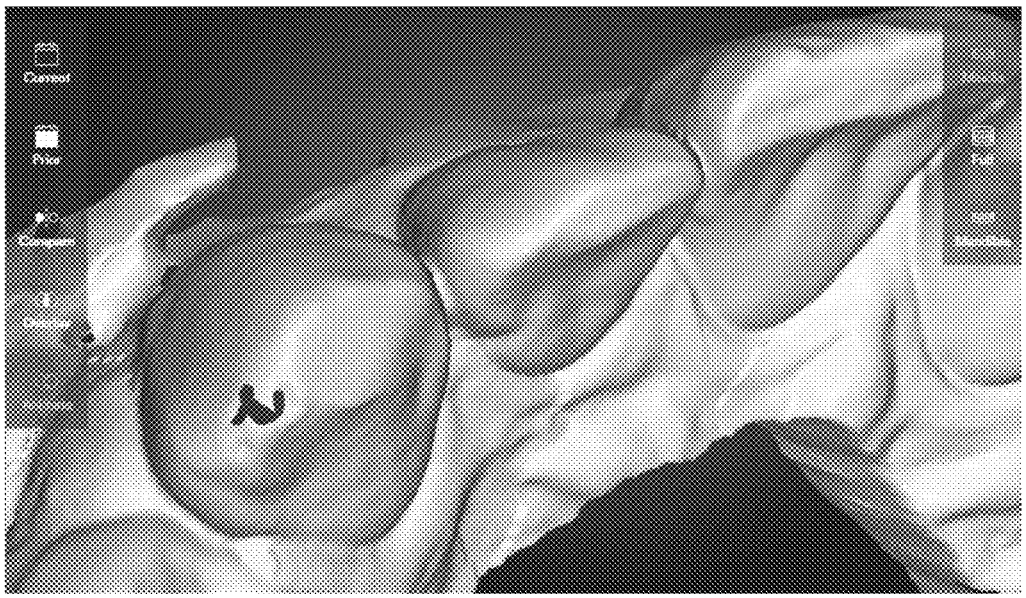
FIGS. 13A-13E are user interfaces showing changes between two digital 3D models from intra-oral scans in the animation mode using the process flow of FIG. 9.
Figure 13B:
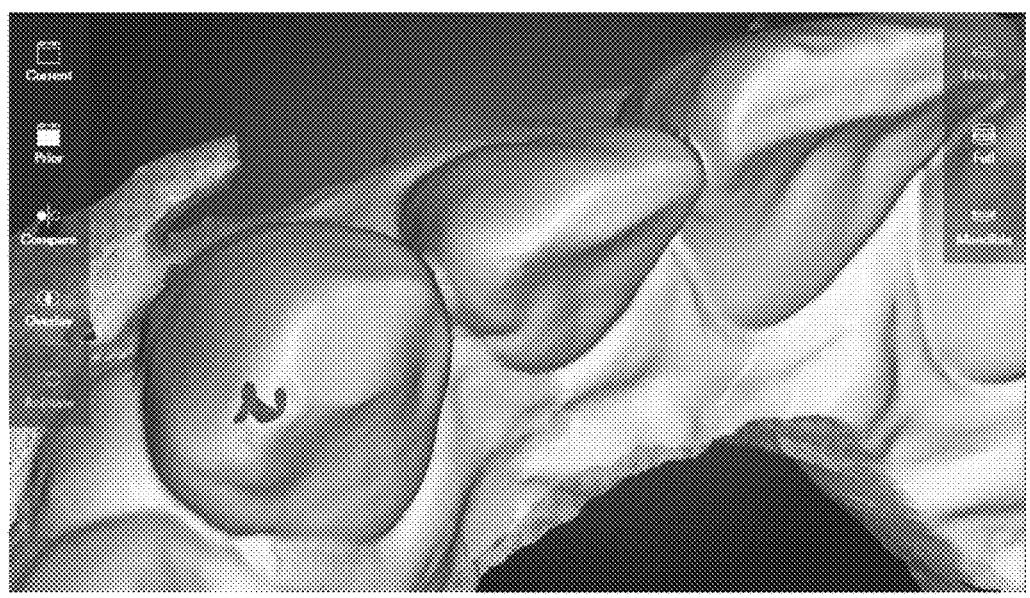
Figure 13C:
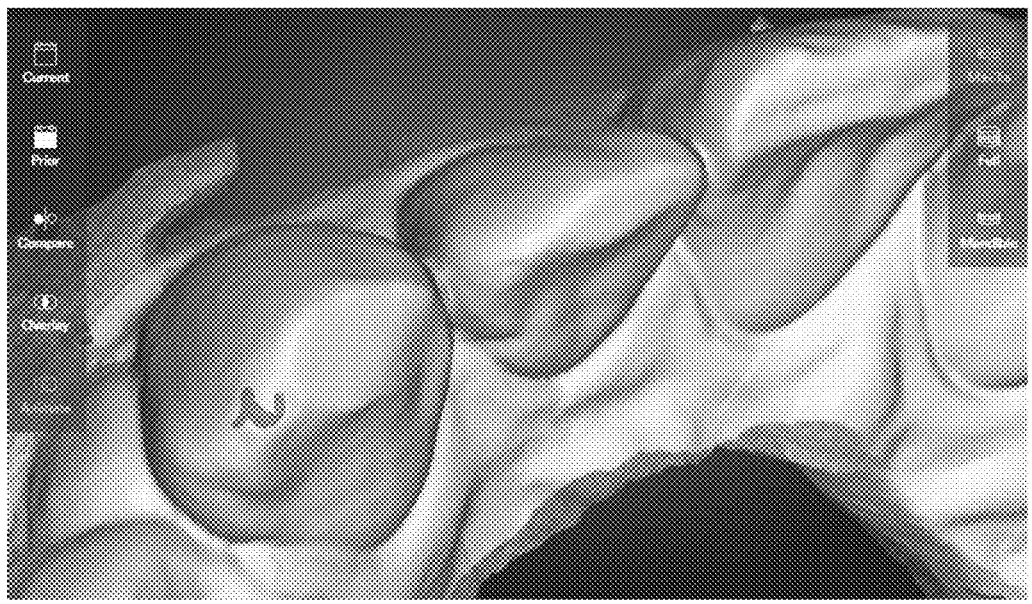
Figure 13D:
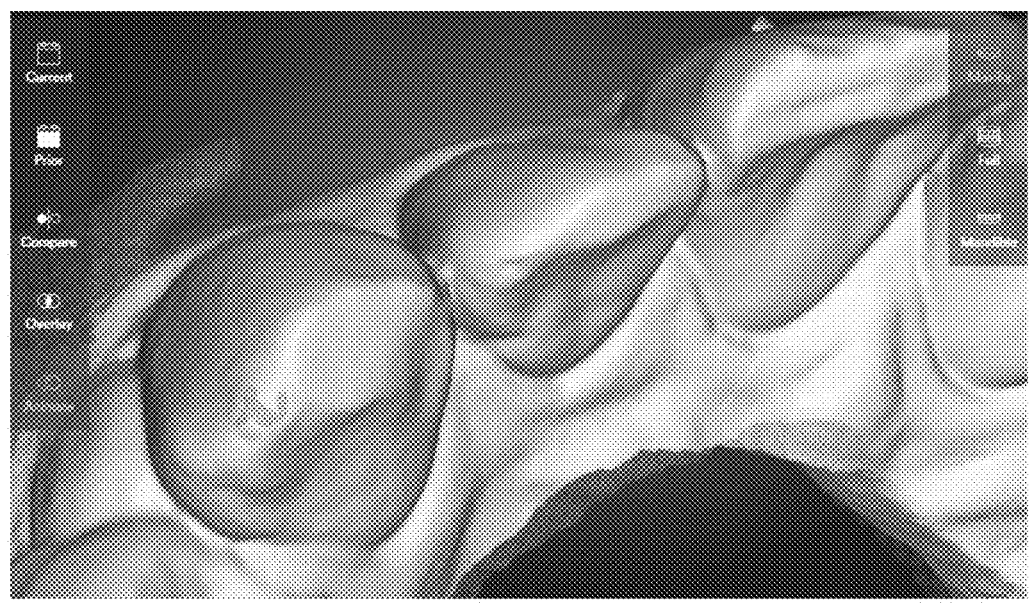
Figure 13E:
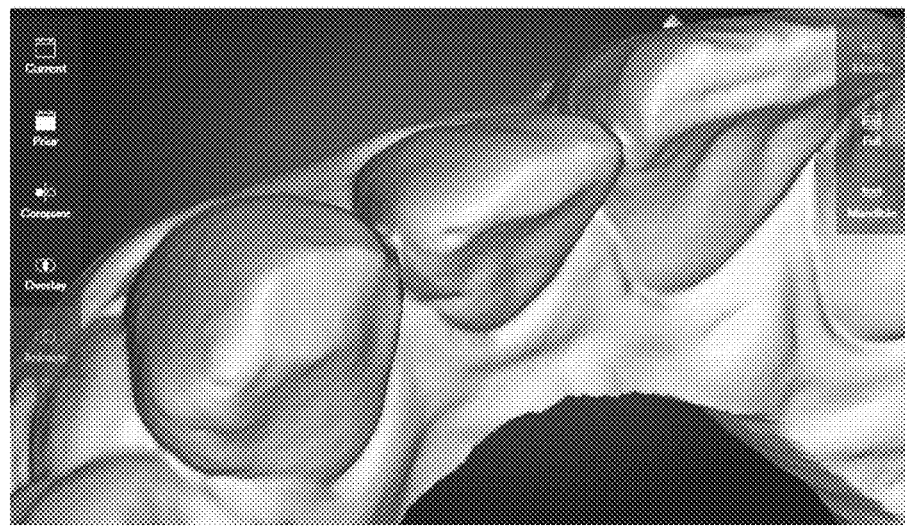

Furthermore, this animation mode can use a different size grid, for example a 3×3 grid or other N×N grid repeated (e.g., horizontally and vertically) across the screen of a display device. FIG. 12 is a process flow for steps 1-10 (executed in the order shown) of an animation mode to show changes between the displayed pixels of the two scans 1 and 2 using a 3×3 grid.

Figure 14:
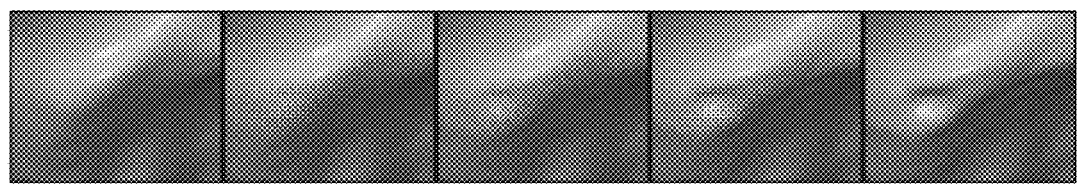
FIG. 14 illustrates portions of the digital 3D models of FIGS. 13A-13E shown in sequence to illustrate the animation mode.

FIGS. 13A-13E are user interfaces to be displayed on an electronic display device and showing changes between two digital 3D models from intra-oral scans in the animation mode using the process flow of FIG. 9. In particular, FIGS. 13A-13E correspond with, respectively, time steps 1-5 in FIG. 9. In these user interfaces, formation of the divot in a tooth can be seen over the time steps as the first model morphs into the second model. FIG. 14 illustrates portions of the user interfaces of FIGS. 13A-13E shown in sequence from left to right (time steps 1-5) to illustrate the animation mode and showing the formation of the divot.

Aside from use of a regular grid as shown, this animation mode can be extended to use stochastic (random) sampling to achieve as many time steps between two or more digital 3D models or scans as there are meaningful pixels on the screen. Also, the animation mode can begin the transition in areas of interest to highlight them first, and then expand out to other or less interesting areas, as identified by a user for example.

The animation mode can use scans of a full arch or partial arch. Alternatively, the animation mode can use segmented scans where individual teeth in the scans are digitally removed from one another either manually or via software processing. Examples of algorithms for segmenting digital 3D models or scans are disclosed in U.S. Patent Application Publication No. 2016/0004811.

The registration of scans, synchronization of views, and animation mode described above can be implemented in software or firmware models for execution by a processor such as processor 20. When implemented in software, the synchronization of views and animation mode described above can use, for example, Hypertext Markup Language 5 (HTML5), the JavaScript programming language, cascading style sheet (CSS), and the Three.JS JavaScript library/API. The registration of scans, synchronization of views, and animation mode described can also be implemented hardware modules or a combination of software and hardware. The processing for the registration of scans, synchronization of views, and animation mode can occur locally or remotely with the resulting user interfaces or views transmitted via a network.

The invention claimed is:

1. A computer-implemented method for displaying a user interface comprising synchronized views of digital 3D models on an electronic display device, wherein:
   a first portion of the user interface displays a first digital 3D model of a person's intra-oral structure;
   a second portion of the user interface displays a second digital 3D model of the person's intra-oral structure;
   the second digital 3D model is obtained at a different time from the first digital 3D model;
   the first digital 3D model is registered with the second digital 3D model at a user-selected first plurality of points on the first digital 3D model and a user-selected second plurality of points on the second digital 3D model, and the registration comprises fitting one of the first and second digital 3D models within a certain degree of accuracy within the other one of the first and second digital 3D models in order to visually illustrate changes between the first and second digital 3D models; and
   the display of the first and second digital 3D models is synchronized via the registration of the first and second digital 3D models such that in response to manipulation of one of the first and second digital 3D models, the other one of the first and second digital 3D models is automatically subject to a same manipulation, while the changes between the first and second digital 3D models are visually illustrated in the first and second portions and within the certain degree of accuracy.

2. The method of claim 1, wherein at least one of the first and second digital 3D models is displayed in the first or second portion with a color rendering indicating changes in the displayed intra-oral structure.

3. The method of claim 2, wherein the color rendering includes a first color indicating a positive change and a second color, different from the first color, indicating a negative change.

4. The method of claim 2, wherein the color rendering is manipulated based upon user input to amplify a feature of the displayed intra-oral structure.

5. The method of claim 1, further comprising one or more icons displayed in the user interface for user control input comprising one or more of a zoom, rotate, pan, or color rendering command.

6. The method of claim 5, wherein the icons are overlaid on one or both of the first and second digital 3D models.

7. A computer-implemented method for displaying a user interface comprising animated and synchronized views of digital 3D models on an electronic display device, wherein:
   the user interface displays a first digital 3D model of a person's intra-oral structure;
   the user interface displays a second digital 3D model of the person's intra-oral structure;
   the user interface progressively displays, between the display of the first and second digital 3D models, pixels from the first digital 3D model and pixels from the second digital 3D model according to a series of time steps having a sequential order with each time step having a different configuration of the pixels from the first digital 3D model and the pixels from the second digital 3D model;
   the second digital 3D model is obtained at a different time from the first digital 3D model;
   the first digital 3D model is registered with the second digital 3D model at a user-selected first plurality of points on the first digital 3D model and a user-selected second plurality of points on the second digital 3D model, and the registration comprises fitting one of the first and second digital 3D models within a certain degree of accuracy within the other one of the first and second digital 3D models in order to visually illustrate changes between the first and second digital 3D models; and
   the display of the first and second digital 3D models is synchronized via the registration of the first and second digital 3D models such that in response to manipulation of one of the first and second digital 3D models in the progressive display, the other one of the first and second digital 3D models is automatically subject to a same manipulation in the progressive display, while the changes between the first and second digital 3D models are visually illustrated in the progressive display and within the certain degree of accuracy.

8. The method of claim 7, wherein the user interface progressively displays at each of the time steps fewer pixels of the first digital 3D model and more pixels of the second digital 3D model than were displayed in the previous time step.

9. The method of claim 7, further comprising one or more icons displayed in the user interface for user control input comprising one or more of a zoom, rotate, pan, or color rendering command.

10. The method of claim 9, wherein the icons are overlaid on the progressive display of the first and second digital 3D models.

11. The method of claim 7, wherein the progressive display includes a color rendering indicating changes in the displayed intra-oral structure.

12. The method of claim 11, wherein the color rendering includes a first color indicating a positive change and a second color, different from the first color, indicating a negative change.

13. The method of claim 11, wherein the color rendering is manipulated based upon user input to amplify a feature of the displayed intra-oral structure.

* * * * *